(12) United States Patent
Troughton

(10) Patent No.: US 11,725,529 B2
(45) Date of Patent: Aug. 15, 2023

(54) FLUID TRANSFER ASSEMBLY FOR ROTATIONAL EQUIPMENT

(71) Applicant: United Technologies Corporation, Farmington, CT (US)

(72) Inventor: Andre H. Troughton, Windsor Locks, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1225 days.

(21) Appl. No.: 16/271,390

(22) Filed: Feb. 8, 2019

(65) Prior Publication Data

US 2020/0256213 A1 Aug. 13, 2020

(51) Int. Cl.
*F01D 9/06* (2006.01)
*F01M 11/02* (2006.01)

(52) U.S. Cl.
CPC ............. *F01D 9/065* (2013.01); *F01M 11/02* (2013.01); *F05D 2260/98* (2013.01)

(58) Field of Classification Search
CPC .......... F01D 9/065; F01D 25/12; F01D 25/18; F01D 25/162; F16L 7/00; F16L 9/18; F01M 11/02; F16N 21/00; F05D 2250/281; F05D 2260/84
See application file for complete search history.

(56) References Cited

U.S. PATENT DOCUMENTS

| 5,335,490 A * | 8/1994 | Johnson ................... F23R 3/20 |
| | | 60/764 |
| 8,944,749 B2 | 2/2015 | Durocher et al. |
| 9,869,204 B2 * | 1/2018 | Winn .................... F01D 25/145 |
| 9,982,600 B2 * | 5/2018 | Socha ....................... F02C 3/06 |
| 2011/0085895 A1 * | 4/2011 | Durocher ............. F16L 59/143 |
| | | 415/178 |
| 2013/0189071 A1 | 7/2013 | Durocher |
| 2017/0292449 A1 * | 10/2017 | Agara ....................... F02C 7/06 |
| 2018/0224043 A1 * | 8/2018 | Hendrickson ......... F01D 25/162 |

OTHER PUBLICATIONS

EP search report for EP20156451.5 dated Jun. 3, 2020.

\* cited by examiner

*Primary Examiner* — Igor Kershteyn
(74) *Attorney, Agent, or Firm* — Getz Balich LLC

(57) ABSTRACT

An inner structure is within an outer structure. A shield mount of a shield is attached to the outer structure. A sleeve of the shield extends from the shield mount through an aperture in the outer structure to a distal end of the shield. The sleeve is mated with the port at the distal end through a slip joint interface where a cylindrical sleeve surface of the sleeve contacts a cylindrical port surface of a port of the inner structure. The fluid transfer tube extends from an inner tube end through a bore of the shield and at least into the port to an outer tube end. An inner coupling is disposed at the inner tube end and mated with the inner structure through a cone seal interface. An outer coupling is disposed at the outer tube end and attached to the outer structure.

17 Claims, 18 Drawing Sheets

FLUID TRANSFER ASSEMBLY FOR ROTATIONAL EQUIPMENT

BACKGROUND OF THE DISCLOSURE

1. Technical Field

This disclosure relates generally to rotational equipment and, more particularly, to a fluid transfer assembly for flowing fluid between different components of a piece of rotational equipment such as a gas turbine engine.

2. Background Information

A gas turbine engine may include a mid-turbine frame between a high pressure turbine rotor and a low pressure turbine rotor. The mid-turbine frame may be configured with a hollow vane radially through which an oil transfer tube extends. Such an oil transfer tube typically routes oil radially inward through one or more internal engine components such as the hollow vane to one or more bearings. While known oil transfer tubes have various advantages, these tubes typically require dismantling the engine (e.g., removing engine rotor(s)) for removal and inspection.

There is a need in the art for an improved fluid transfer assembly.

SUMMARY OF THE DISCLOSURE

According to an aspect of the present disclosure, an assembly is provided for a piece of rotational equipment. This assembly includes an outer structure, an inner structure, a shield and a fluid transfer tube. The inner structure is within the outer structure, and the inner structure includes a port. The shield includes a shield mount and a sleeve. The shield mount is attached to the outer structure. The sleeve extends from the shield mount through an aperture in the outer structure to a distal end of the shield. The sleeve is mated with the port at the distal end through a slip joint interface where a cylindrical sleeve surface of the sleeve contacts a cylindrical port surface of the port. The fluid transfer tube includes an inner tube end, an outer tube end, an inner coupling and an outer coupling. The fluid transfer tube extends from the inner tube end through a bore of the shield and at least into the port to the outer tube end. The inner coupling is disposed at the inner tube end and mated with the inner structure through a cone seal interface. The outer coupling is disposed at the outer tube end and attached to the outer structure.

According to another aspect of the present disclosure, another assembly is provided for a piece of rotational equipment. This assembly includes an outer structure, an inner structure, a shield and a fluid transfer tube. The inner structure is within the outer structure, and the inner structure includes a port. The shield includes a shield mount and a sleeve. The shield mount is attached to the outer structure. The sleeve extends from the shield mount through an aperture in the outer structure to a distal sleeve end of the sleeve. The sleeve is mated with the port at the distal sleeve end through a slip joint interface which forms a complete seal between the sleeve and the port. The fluid transfer tube includes an inner tube end, an outer tube end, an inner coupling and an outer coupling. The fluid transfer tube extends from the inner tube end through a bore of the shield and at least into the port to the outer tube end. The inner coupling is disposed at the inner tube end and mated with the inner structure through a cone seal interface. The outer coupling is disposed at the outer tube end and attached to the outer structure.

According to still another aspect of the present disclosure, another assembly is provided for a piece of rotational equipment. This assembly includes an outer structure, an inner structure, a shield, a fluid transfer tube and a retainer. The inner structure is within the outer structure, and the inner structure includes a port. The shield includes a shield mount and a sleeve. The sleeve extends from the shield mount through an aperture in the outer structure to a distal sleeve end of the sleeve. The sleeve is mated with the port at the distal sleeve end through a slip joint interface. The fluid transfer tube includes an inner tube end, an outer tube end, an inner coupling and an outer coupling. The fluid transfer tube extends from the inner tube end through a bore of the shield and at least into the port to the outer tube end. The inner coupling is disposed at the inner tube end and mated with the inner structure through a cone seal interface. The outer coupling is disposed at the outer tube end. The retainer rotatably fixes the shield mount and the outer coupling to the outer structure.

A cylindrical sleeve surface of the sleeve may contact a cylindrical port surface of the port at the slip joint interface.

The retainer may include a fastener and a retainer plate. The retainer plate may be rotatably fixed to the outer coupling through a second slip joint interface. The fastener may mount the retainer plate and the shield mount to the outer structure.

The sleeve may include a cylindrical sleeve surface. The port may include a cylindrical port surface that contacts the cylindrical sleeve surface at the slip joint interface.

The slip joint interface may form a complete seal between the sleeve and the port.

The slip joint interface may be configured as or otherwise include an interference fit between the sleeve and the port.

The sleeve may circumscribe the port at the slip joint interface.

The port may circumscribe the sleeve at the slip joint interface.

The sleeve may extend into an annular slot in the port at the slip joint interface.

The inner coupling may have a maximum width. The bore may have a minimum diameter at the distal sleeve end that is greater than the maximum width.

The bore may taper inward as the sleeve extends away from the distal sleeve end.

The bore may be configured as a constant diameter bore.

The inner coupling may be attached to the inner structure by a threaded interface between the inner coupling and the inner structure.

The inner coupling may include a frustoconical coupling surface. The inner structure may include a frustoconical structure surface that contacts the frustoconical coupling surface at the cone seal interface.

An annular seal may be included and arranged at the cone seal interface.

A retainer may be included, and may rotatably fix the outer coupling to the outer structure and attach the shield mount to the outer structure.

The retainer may include a fastener and a retainer plate. The retainer plate may rotatably fix to the outer coupling through a second slip joint interface. The fastener may mount the retainer plate and the shield mount to the outer structure.

The outer structure may be configured as or otherwise include a casing. The inner structure may be configured as or otherwise include a bearing housing. The fluid transfer tube may be configured to deliver fluid to a passage in the bearing housing.

An array of vanes may be included and arranged between the outer structure and the inner structure. The array of vanes may include a first hollow vane. The shield may extend through the first hollow vane.

The foregoing features and the operation of the invention will become more apparent in light of the following description and the accompanying drawings.

DETAILED DESCRIPTION

Figure 1:
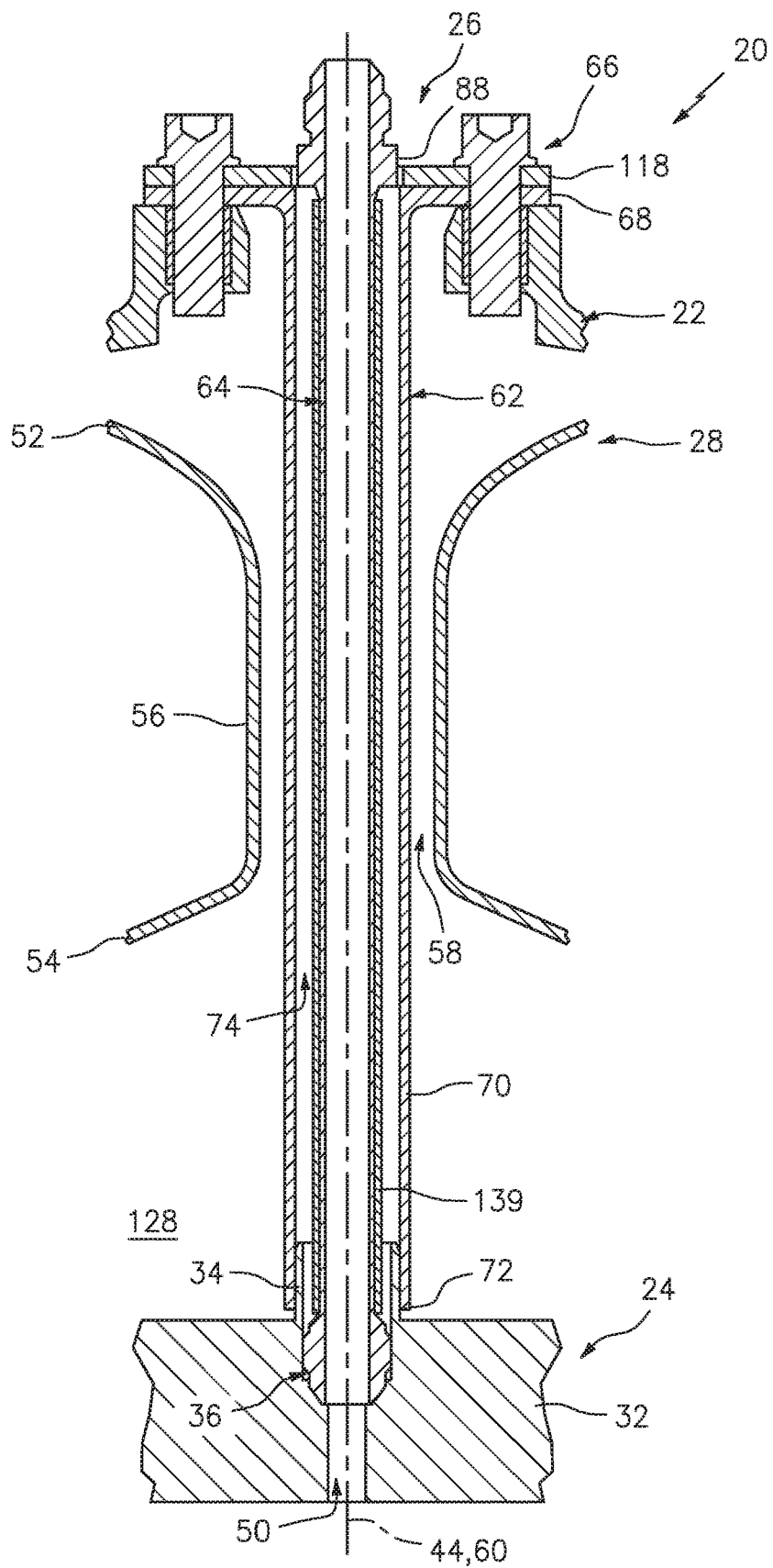
FIG. 1 is a sectional illustration of a portion of an assembly for a piece of rotational equipment such as a gas turbine engine.
Figure 15:
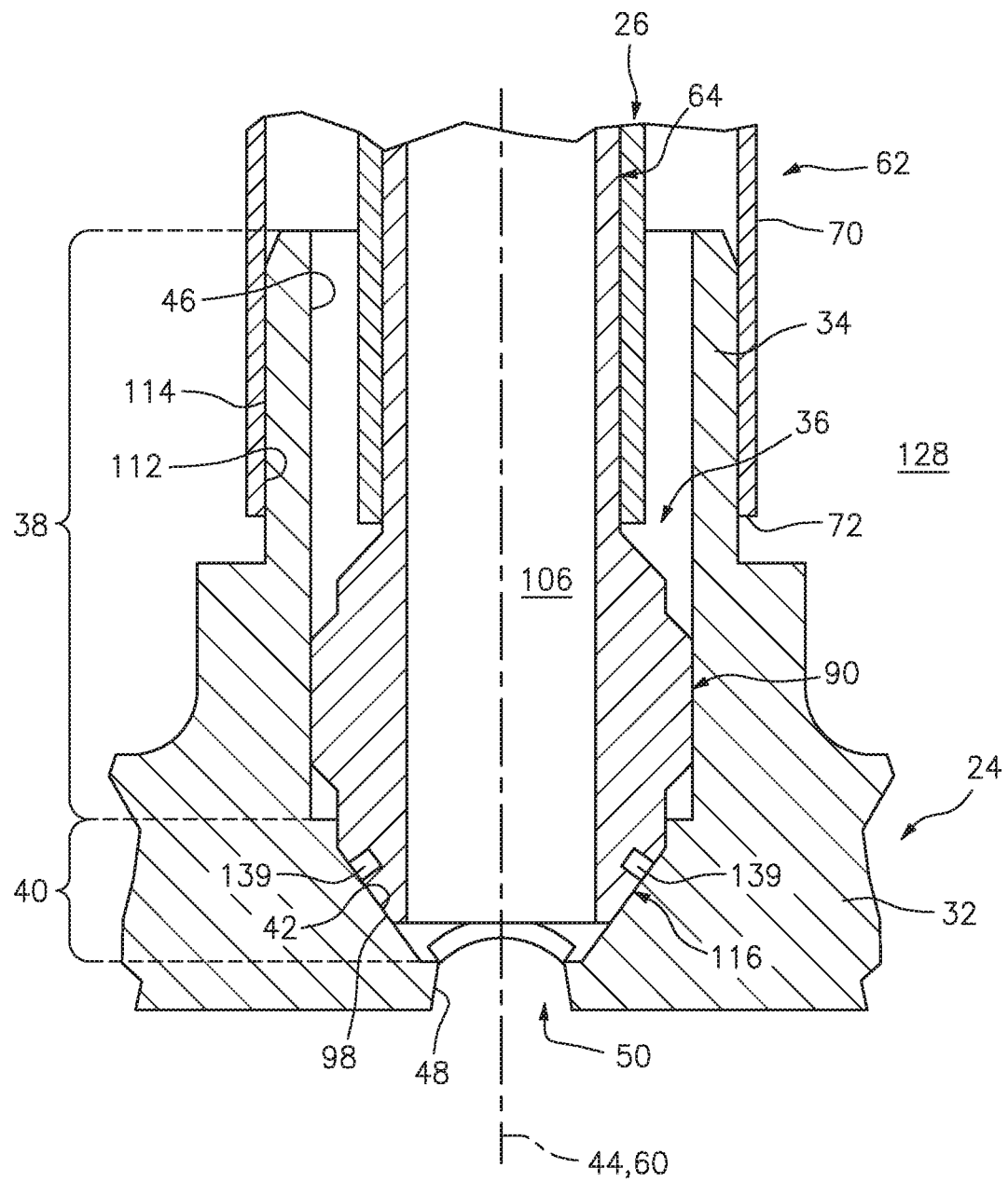
FIG. 15 is a sectional illustration of a portion of another assembly for the piece of rotational equipment.

FIG. 1 is a sectional illustration of a portion of an assembly 20 for a piece of rotational equipment. For ease of description, this piece of rotational equipment is referred to below as a gas turbine engine (e.g., see 140 in FIG. 15). The present disclosure, however, is not limited to any particular types or configurations of rotational equipment. The piece of rotational equipment, for example, may alternatively be configured as a wind, water or steam turbine, a rotary internal combustion engine or any other piece of rotational equipment that flows fluid (e.g., lubricant, coolant, etc.) between inner and outer portions thereof.

The assembly 20 includes an outer structure 22, an inner structure 24 and at least one fluid transfer assembly 26. The specific assembly 20 of FIG. 1 also includes a vane assembly 28 such as, but not limited to, a mid-turbine vane assembly.

The outer structure 22 may be configured as a casing such as, but not limited to, a mid-turbine casing. The outer structure 22, for example, may house and circumscribe one or more components of, for example, a core of the gas turbine engine; e.g., see engine 140 of FIG. 15. The outer structure 22 of FIGS. 1 and 2, in particular, is configured as a tubular structure which extends circumferentially around a rotational axis 30 of the gas turbine engine.

The inner structure 24 may be configured as an inner housing and/or a support structure. The inner structure 24, for example, may house and/or support at least one bearing assembly in the gas turbine engine; e.g., see FIGS. 2 and 15. The inner structure 24 of FIGS. 1 and 2, in particular, is configured as a tubular structure which extends circumferentially around the rotational axis 30 of the gas turbine engine. This inner structure 24 is located (e.g., housed) within the outer structure 22.

Figure 3:
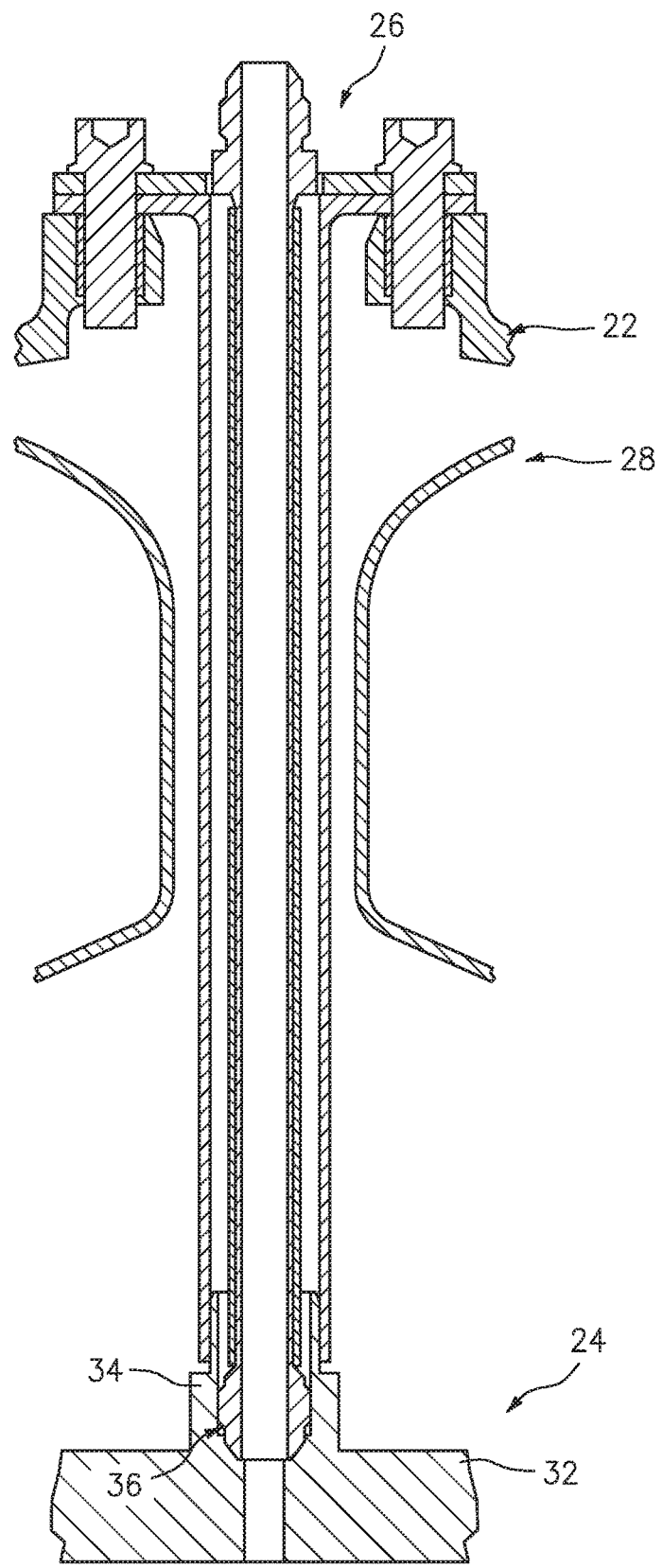
FIG. 3 is a sectional illustration of a portion of another assembly for the piece of rotational equipment.
Figure 4:
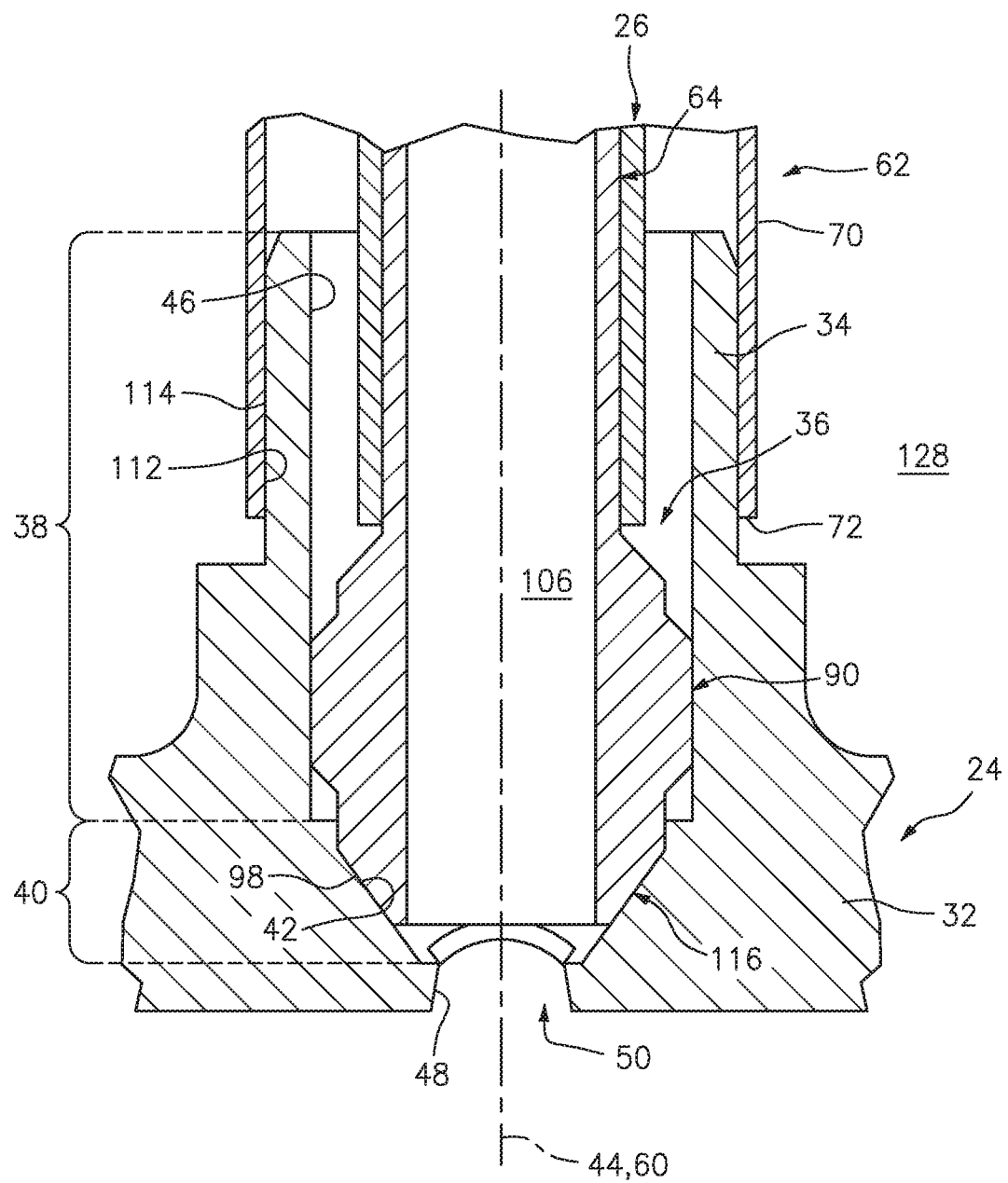
FIG. 4 is an enlarged sectional illustration of a portion of the assembly of FIG. 1.

The inner structure 24 of FIG. 1 includes a base 32 and at least one tubular port 34 which projects out from the base 32. The port 34 at least partially (or completely as shown in FIG. 3) forms a coupling receptacle 36 for the fluid transfer assembly 26. Referring to FIG. 4, the coupling receptacle 36 of FIG. 1 includes a counterbore region 38 and seal interface region 40. This seal interface region 40 is configured with a frustoconical structure surface 42. This frustoconical structure surface 42 tapers radially inward, relative to a centerline 44 of the coupling receptacle 36, from a wall 46 of the counterbore region 38 to a wall 48 of a fluid passage 50 in the inner structure 24. The frustoconical structure surface 42 is thereby offset from the centerline 44 and/or the wall(s) 46, 48 by an acute angle such as, but not limited to, exactly or approximately (e.g., +/−1°) thirty-seven degrees (37°).

Figure 2:
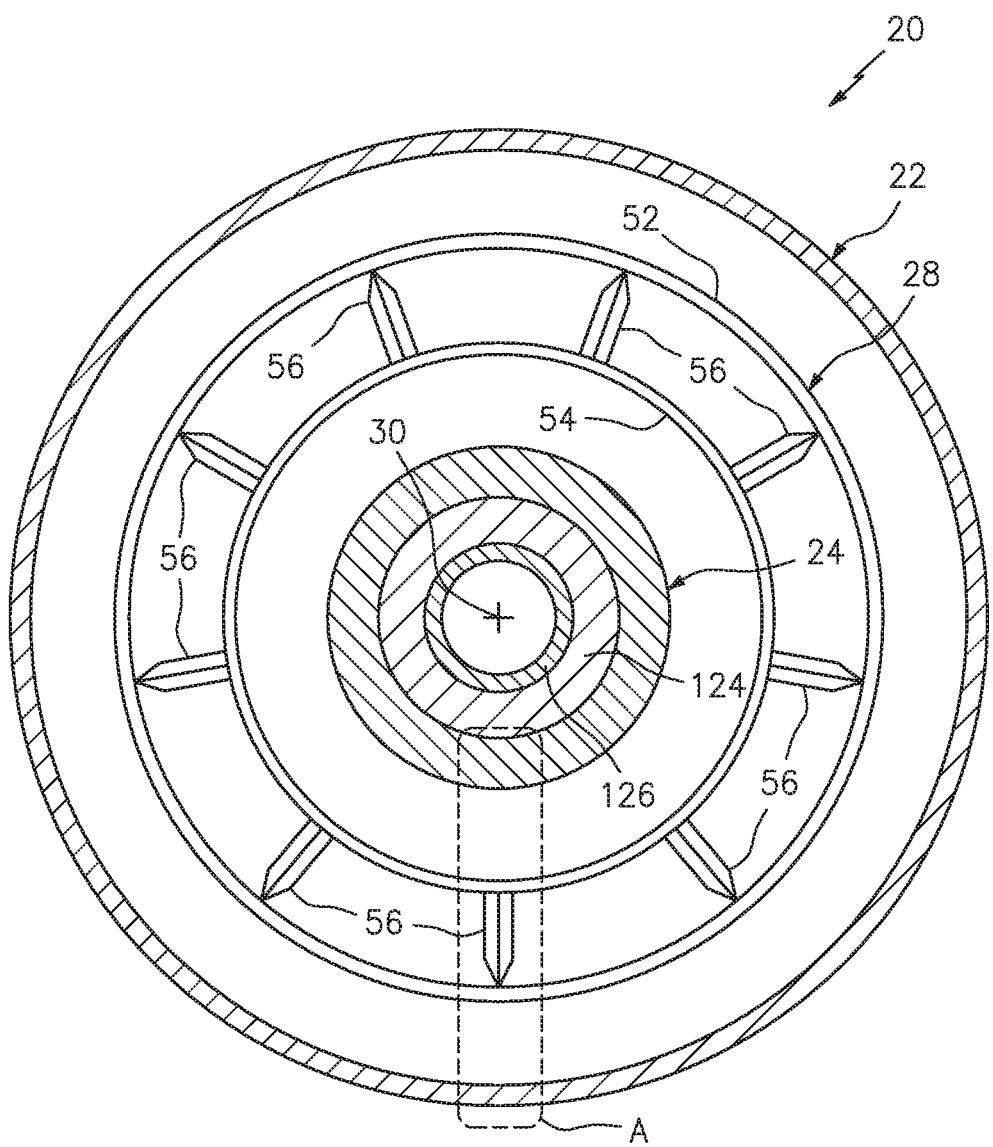
FIG. 2 is a schematic cross-sectional illustration of another portion of the assembly of FIG. 1, where the portion of FIG. 1 relates generally to region A in FIG. 2.

The vane assembly 28 of FIGS. 1 and 2 includes a tubular outer platform 52, a tubular inner platform 54 and an array of vanes 56 arranged circumferentially around the rotational axis 30. Each of the vanes 56 extends between and is connected to the outer platform 52 and the inner platform 54. One or more of the vanes 56 may each be configured a hollow vane. The vane shown in FIG. 1, for example, includes a cavity 58 that extends, radially relative to the rotational axis 30/axially relative to the centerline 44, through the vane 56. The vane assembly 28 of FIGS. 1 and 2 is located, radially relative to the rotational axis 30/axially relative to the centerline 44, between the outer structure 22 and the inner structure 24.

Referring to FIG. 1, the fluid transfer assembly 26 extends longitudinally along a centerline 60 which may be coaxial with the centerline 44 of the coupling receptacle 36. This fluid transfer assembly 26 includes a shield 62 and a fluid transfer tube 64. The specific fluid transfer assembly 26 of FIG. 1 also includes a retainer 66 configured to mount both the shield 62 and the fluid transfer tube 64 to the outer structure 22.

Figure 5:
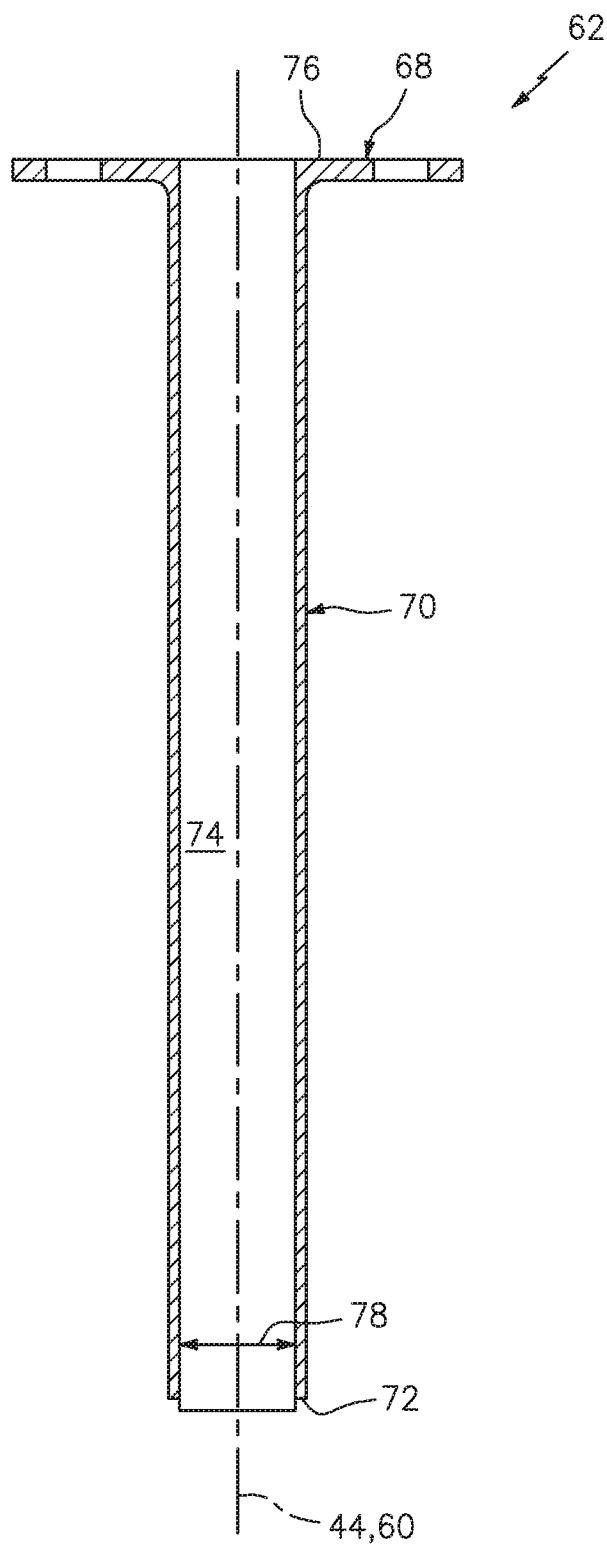
FIG. 5 is a sectional illustration of a shield.

The shield 62 of FIG. 5 includes a shield mount 68 and a shield sleeve 70. The shield mount 68 may be configured as an annular flange. The shield mount 68 of FIG. 5, for example, extends circumferentially around the centerline 60 and the sleeve 70. The shield mount 68 extends radially, relative to the centerline 60, out from the sleeve 70 to a distal outer end of the shield mount 68. The sleeve 70 is configured as a tubular member. The sleeve 70 of FIG. 5, for example, includes a tubular sidewall that extends circumferentially around the centerline 60. The tubular sidewall projects out from the shield mount 68 longitudinally along the centerline 60 to a distal end 72 of the shield 62. The shield mount 68 and the sleeve 70 thereby may collectively form a bore 74 that extends longitudinally along the centerline 60 through the shield 62 between opposing ends thereof 72 and 76. The bore 74 of FIG. 5 is configured as a constant diameter bore and, thus, has a uniform (e.g., constant) minimum diameter 78 at the ends 72 and 76 of the sleeve 70 and longitudinally therebetween. However, the present disclosure is not limited to such a constant diameter bore as discussed below in further detail. For example, where the shield 62 is configured as a single monolithic body as shown in FIG. 5, the mount 68 and the sleeve 70 may be machined from a single billet of material. Alternatively, the mount 68 and the sleeve 70 may be formed separately and then welded and/or otherwise bonded together to provide the single monolithic body.

Figure 6:
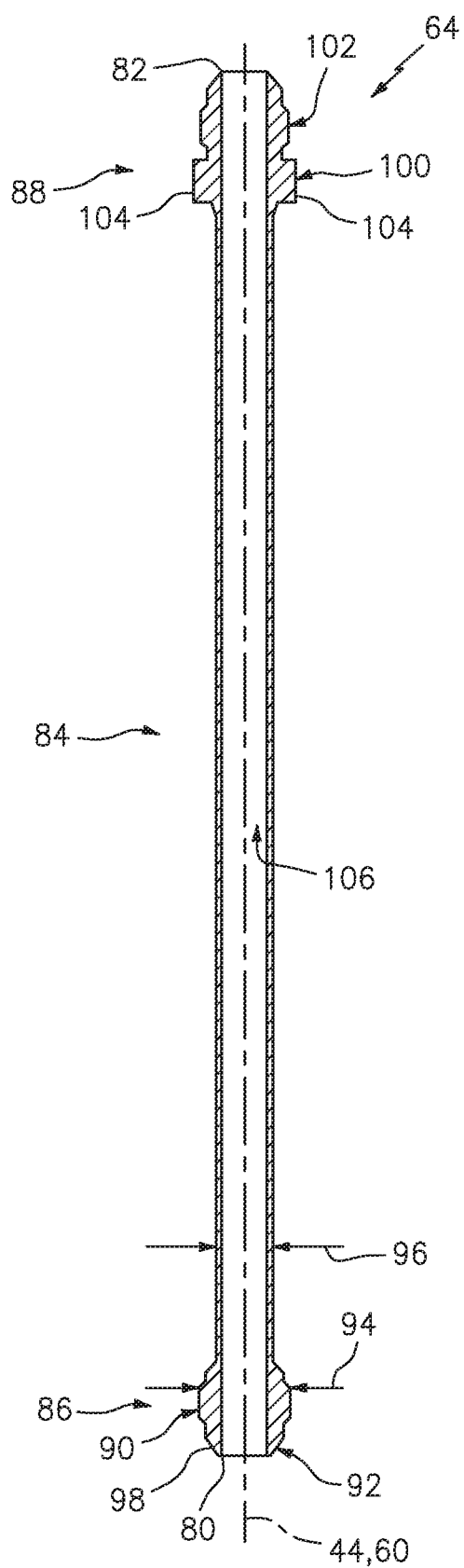
FIG. 6 is a sectional illustration of a fluid transfer tube.

The fluid transfer tube 64 of FIG. 6 extends longitudinally along the centerline 60 between an inner tube end 80 and an outer tube end 82. The fluid transfer tube 64 includes a tubular portion 84, a tubular inner coupling 86 and a tubular outer coupling 88. The tubular portion 84 includes a tubular sidewall that extends circumferentially around the centerline 60. The tubular sidewall extends longitudinally along the centerline 60 between the inner coupling 86 and the outer coupling 88.

The inner coupling 86 is disposed at (e.g., on, adjacent or proximate) the inner tube end 80. This inner coupling 86 includes a threaded portion 90 and a seal interface portion 92. The threaded portion 90 defines a maximum width 94 (e.g., largest diameter) of the inner coupling 86. This maximum width 94 is sized to be greater than a maximum width 96 (e.g., largest diameter) of the tubular portion 84. The maximum width 94 is also sized to be less than the minimum diameter 78 of the bore 74 at least at (e.g., on, adjacent or proximate) the inner tube end 80 to facilitate in the assembly/disassembly of the fluid transfer tube 64 as discussed below in further detail. The seal interface portion 92 is located between the threaded portion 90 and the inner tube end 80. The seal interface portion 92 is configured with a frustoconical coupling surface 98. This frustoconical coupling surface 98 tapers radially inward as the inner coupling 86 extends longitudinally along the centerline 60 to or towards the inner tube end 80. The frustoconical coupling surface 98 is thereby offset from the centerline 60 an acute angle such as, but not limited to, exactly or approximately (e.g., +/−1°) thirty-seven degrees (37°). This angle may be selected to correspond to the angle associated with the surface 42; see FIG. 4.

Figure 7:
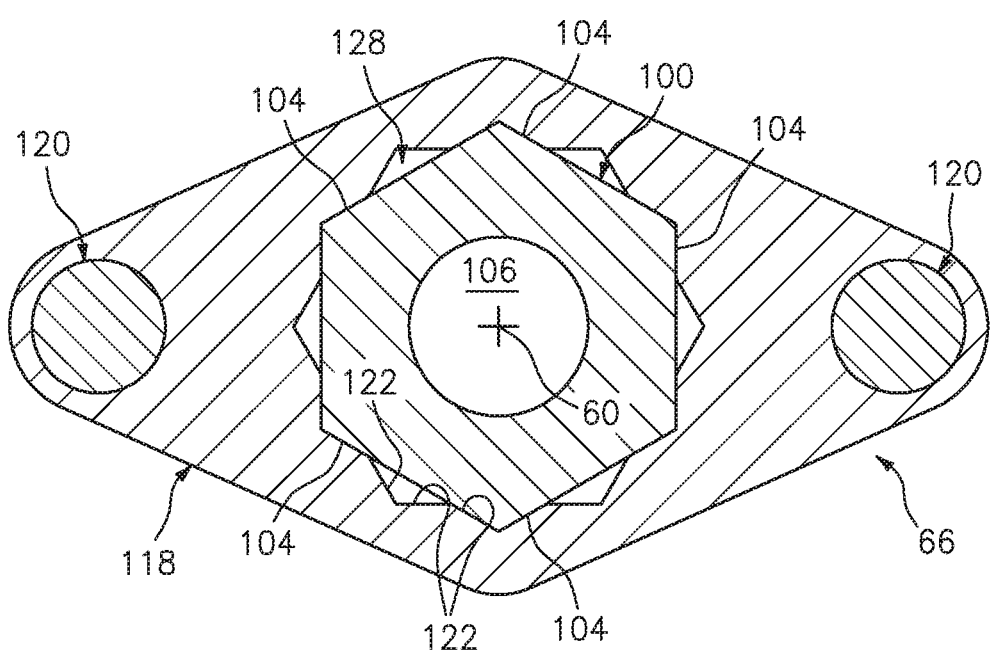
FIG. 7 is a cross-sectional illustration of a fluid transfer assembly.

The outer coupling 88 is disposed at (e.g., on, adjacent or proximate) the outer tube end 82. This outer coupling 88 includes a retention portion 100 and a threaded portion 102 located between the retention portion 100 and the outer tube end 82. Referring to FIG. 7, the retention portion 100 projects radially outward, relative to the centerline 60, from the tubular portion 84 (see FIG. 6) to one or more surfaces 104. Each of these surfaces 104 may be a flat surface. The surfaces 104 may be collectively arranged about the centerline 60 to form a hexagonal or other polygonal (e.g., bolt head) shape.

Referring to FIG. 6, a fluid passage 106 extends longitudinally along the centerline 60 through the fluid transfer tube 64 and its members between the inner tube end 80 and the outer tube end 82.

Figure 8A:
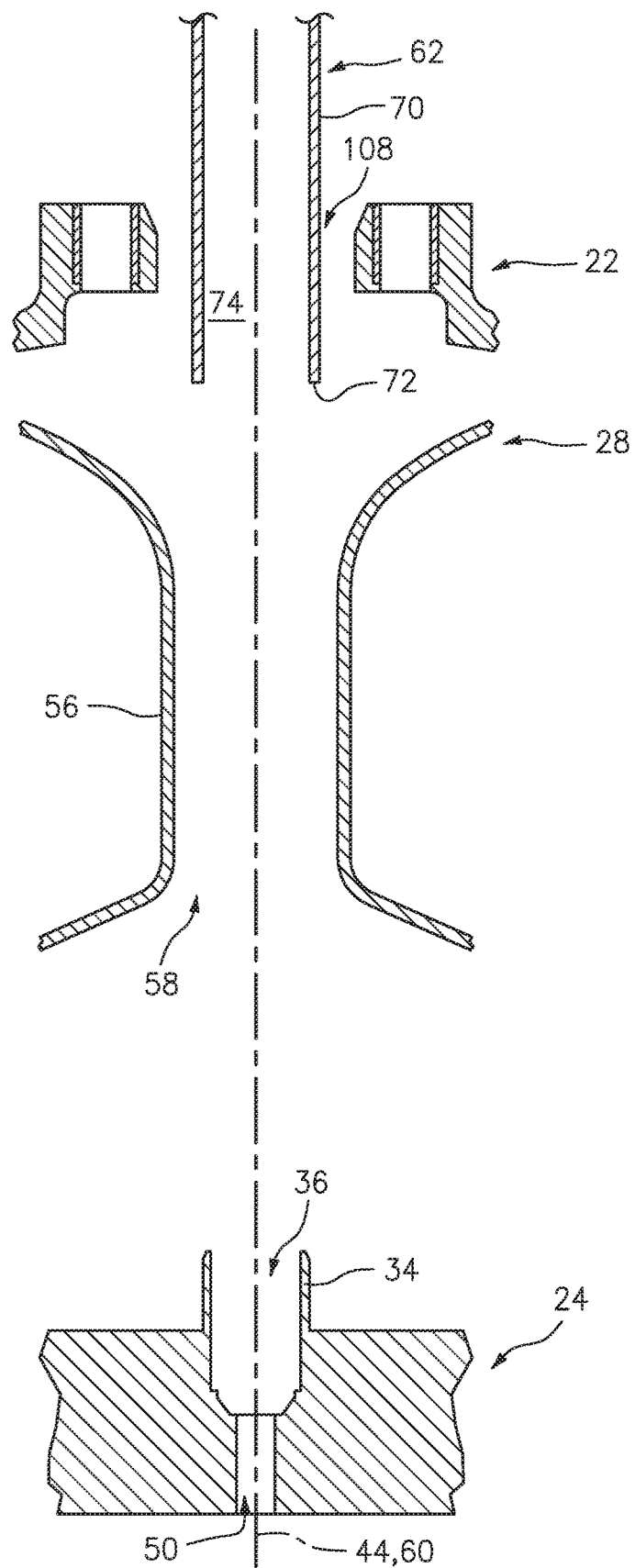
FIGS. 8A-8C are sectional illustrations depicting a sequence for installing the shield with an outer structure, a vane assembly and an inner structure.
Figure 8B:
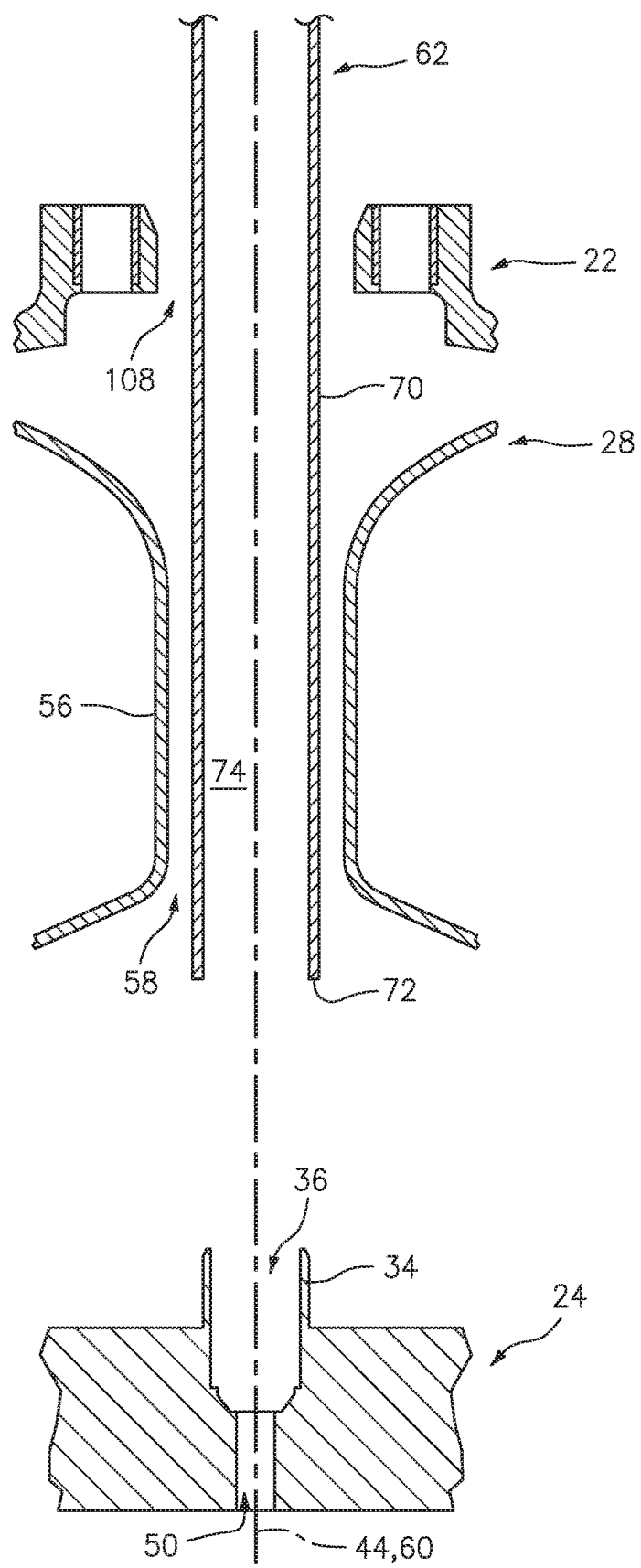
Figure 8C:
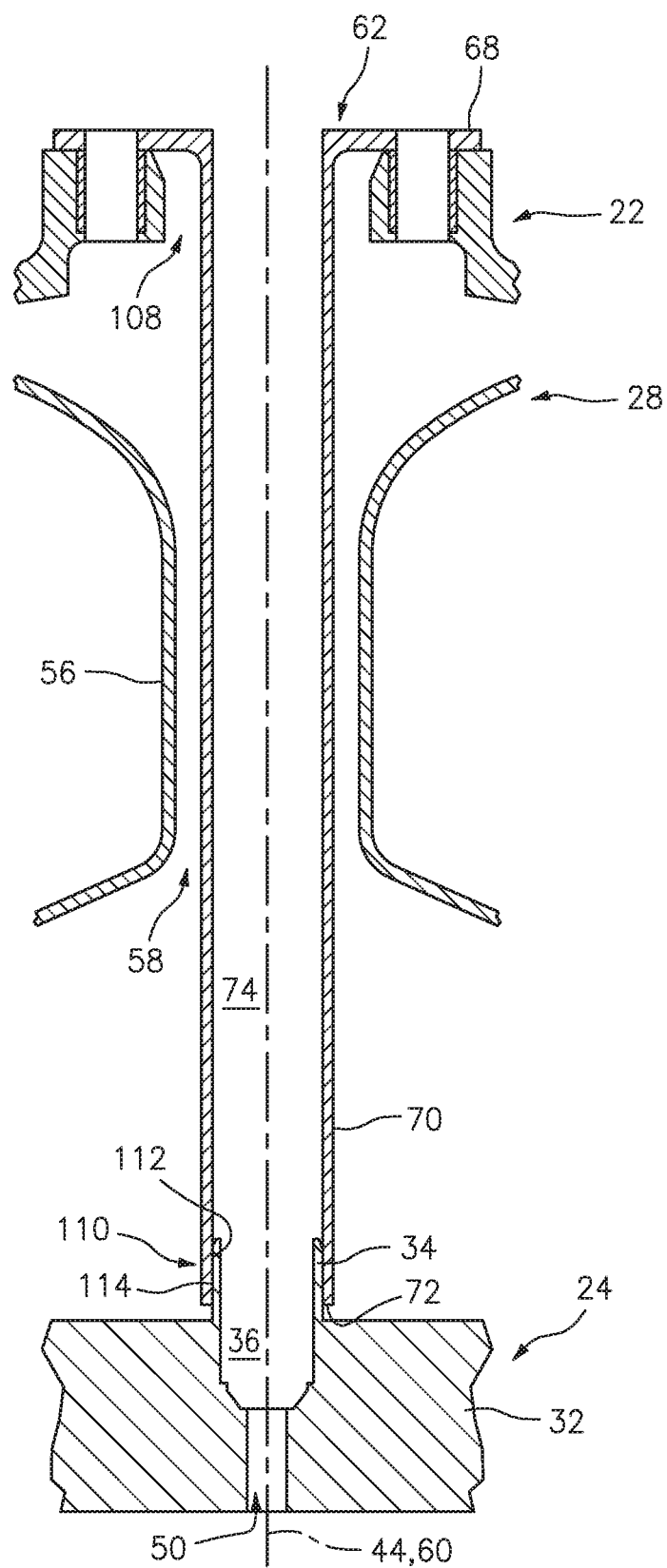

During installation of the fluid transfer assembly 26 of FIG. 1, the shield 62 is mated with the outer structure 22, the inner structure 24 and the vane assembly 28. For example, referring to FIG. 8A, the distal end 72 of the shield 62 is inserted into and passed through an aperture 108 in the outer structure 22. Referring to FIG. 8B, the distal end 72 of the shield 62 is subsequently inserted into and passed through the cavity 58 of a respective one of the vanes 56. Referring to FIG. 8C, the sleeve 70 at the distal end 72 of the shield 62 is subsequently mated with the port 34 at a (e.g., sealed) slip joint interface 110 between the sleeve 70 and the port 34. The term "slip joint interface" may describe an interface/engagement between elements that enables those elements to slide relative (e.g., against) one another. For example, in the specific embodiment of FIG. 4, an inner cylindrical sleeve surface 112 of the sleeve 70 circumscribes and contacts an outer cylindrical port surface 114 of the port 34 at the interface. There may be a slight interface fit between the surfaces 112 and 114 so as to form a complete seal between the sleeve 70 and the port 34 while, for example, still enabling the sleeve 70 and the port 34 to translate (e.g., slide) along the centerline 60 relative to one another to accommodate thermal growth during operation of the gas turbine engine. The term "complete seal" may describe a seal that substantially or completely prevents fluid leakage thereacross. By contrast, a partial seal may enable controlled fluid leakage thereacross.

Figure 9:
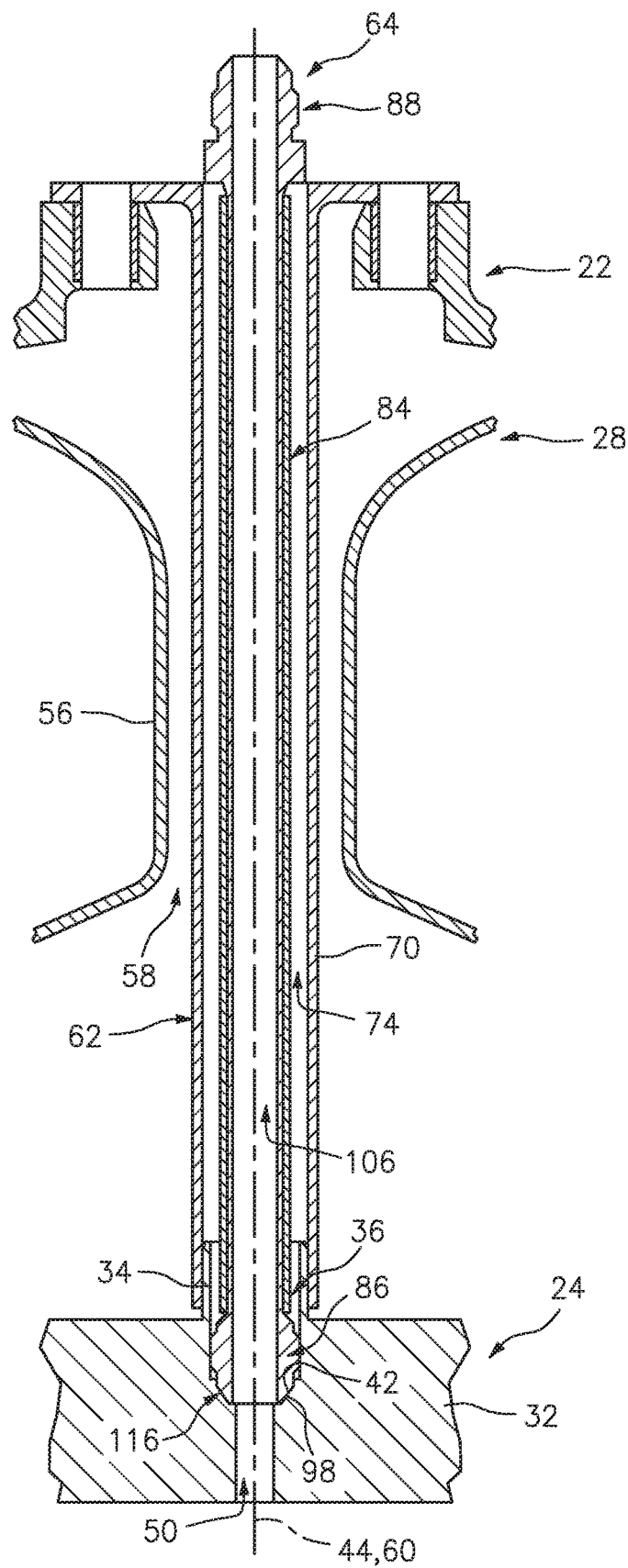
FIG. 9 is a sectional illustration of the shield and the fluid transfer tube installed with the outer structure, the vane assembly and the inner structure.

Referring to FIG. 9, the inner coupling 86 is inserted into and passed through the bore 74 of the shield 62. This insertion and passing through of the inner coupling 86 is enabled by the width 94 (see FIG. 6) of the inner coupling 86 being sized to be less than the diameter 78 (see FIG. 5) of the bore 74 as discussed above. The inner coupling 86 is inserted into and mated with (e.g., threaded into) the coupling receptacle 36 at a threaded interface such that the frustoconical coupling surface 98 engages (e.g., contacts) the frustoconical structure surface 42 so as to provide a cone seal interface 116 therebetween; see also FIG. 4. This cone seal interface 116 is operable to form a complete seal between the fluid transfer tube 64 and the inner structure 24 to facilitate a fluid coupling between the fluid passage 106 of the fluid transfer tube 64 and the fluid passage 50 of the inner structure 24.

Figure 10:
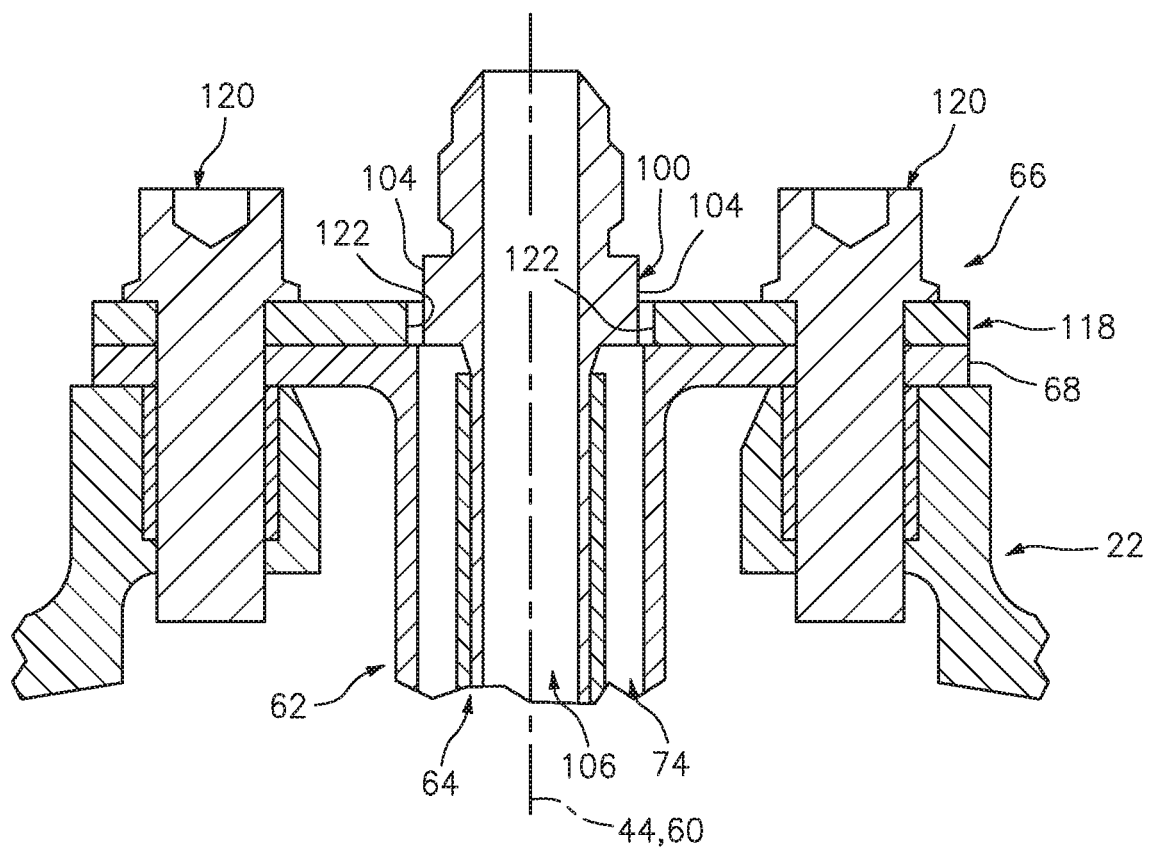
FIG. 10 is another enlarged sectional illustration of a portion of the assembly of FIG. 1.

Referring to FIGS. 7 and 10, the retainer 66 is configured to mount both the shield 62 and the fluid transfer tube 64 to the outer structure 22. The mount of FIGS. 7 and 10, for example, attaches the shield 62 to the outer structure 22 in such a manner that the shield mount 68 and, thus, the shield 62 cannot rotate about or translate along the centerline 60. By contrast, the retainer 66 attaches the fluid transfer tube 64 to the outer structure 22 in such a manner that the outer coupling 88 and, thus, the fluid transfer tube 64 cannot rotate about the centerline 60, but can translate along the centerline 60 to accommodate thermal growth.

In the specific embodiment of FIGS. 7 and 10, the retainer 66 includes a retainer plate 118 and one or more fasteners 120; e.g., bolts. The retainer plate 118 includes a coupling aperture formed by one or more surfaces 122. Each of these surfaces 122 may be a flat surface. The surfaces 122 may be collectively arranged about the centerline 60 to form a hexagonal or other polygonal (e.g., bolt head) shape. This shape is selected to correspond to (e.g., match or include similar features as) the shape formed by the surfaces 104 of the outer coupling 88. In this manner, the outer coupling 88 may be received within the coupling aperture, and one or more surfaces 104 of the outer coupling 88 may be abutted flush against a respective one of the surfaces 122 of the retainer plate 118 at a (e.g., unsealed) slip joint interface. The retainer plate 118 is thereby rotationally fixed to the outer coupling 88.

The shield mount 68 is sandwiched between the retainer plate 118 and the outer structure 22. Each of the fasteners 120 is inserted sequentially through respective fastener apertures in the retainer plate 118 and the shield mount 68, and then threaded into a fastener aperture in the outer structure 22. The retainer plate 118 thereby clamps the shield mount 68 against the outer structure 22 to prevent axial translation of the shield 62 along the centerline 60. The fasteners 120 prevent the shield mount 68 and the retainer plate 118 and, thus, the fluid transfer tube 64 from rotating about the centerline 60.

The above described configuration of the fluid transfer assembly 26 enables the shield 62 and the fluid transfer tube 64 to be installed (as described above) and removed from the gas turbine engine from an exterior of the outer structure 22. As a result, components (e.g., 62 and/or 64) of the fluid transfer assembly 26 may be inspected, repaired and/or replaced without disassembly of, for example, the engine core; e.g., removal of an internal rotating assembly or components thereof such as rotor(s) and shaft(s). This may significantly decrease the cost and time associated with inspection, repair and/or replacement of fluid transfer assembly 26 components.

Referring to FIG. 1, during operation, fluid such as lubricant and/or coolant may flow through the fluid transfer tube 64 and into the passage 50 of the inner structure 24 for supplying that fluid to at least one bearing 124 that supports a shaft 126 (see FIG. 2). Under normal conditions, the cone seal interface 116 (see FIG. 4) prevents leakage (e.g., backflow) into the bore 74 of the shield 62. However, in the event the cone seal interface 116 should degrade and/or one or more elements (e.g., the coupling receptacle 36 and/or the fluid transfer tube 64) of the assembly 26 should fail (e.g., crack), fluid leaked into the bore 74 will flow towards the outer coupling 88 as the slip joint interface 110 prevents fluid leakage into the plenum 128 adjacent the port 34. Referring to FIG. 10, fluid within the bore 74 may flow out of the fluid transfer assembly 26 through gaps 128 (see FIG. 7) between the outer coupling 88 and the retainer plate 118. Thus, visual inspection of the exterior of the outer structure 22 may be used to quickly determine if the fluid transfer assembly 26 requires maintenance.

Figure 11:
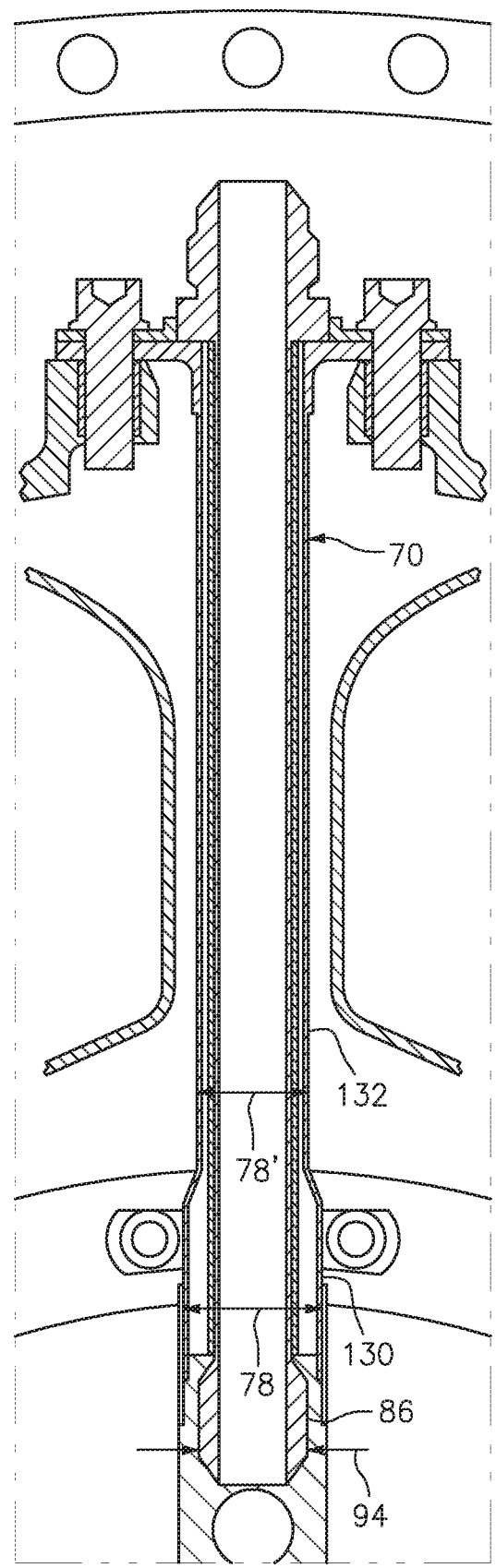
FIG. 11 is a sectional illustration of a portion of another assembly for the piece of rotational equipment.
Figure 12:
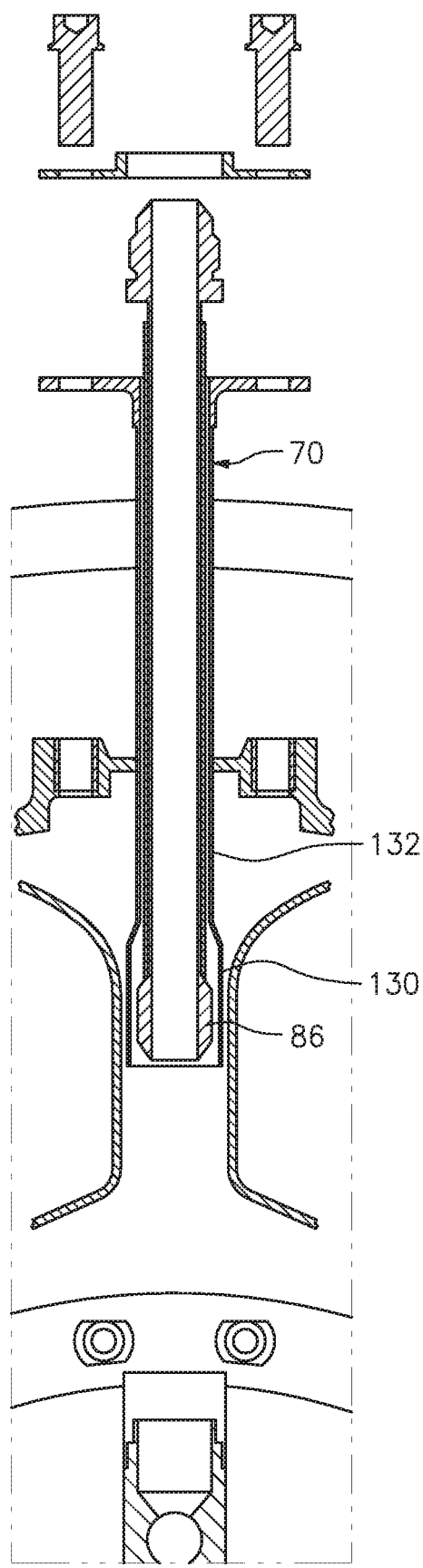
FIG. 12 is an exploded sectional illustration of the assembly of FIG. 11.

In some embodiments, referring to FIGS. 11 and 12, the sleeve 70 may be swaged to provide the bore 74 with a tapered geometry. For example, the bore 74 within an inner portion 130 of the sleeve 70 may have the minimum diameter 78 that is greater than a minimum diameter 78' of the bore 74 within an outer portion 132 of the sleeve 70. In such embodiments, the minimum diameter 78 of the bore 74 within the inner portion 130 is still sized greater than the maximum width 94 (see also FIG. 6) of the inner coupling 86 such that the inner coupling 86 may be retracted into the inner portion 130 of the sleeve 70 (see FIG. 12) during installation and removal of the fluid transfer assembly 26. This configuration enables protection of the inner coupling 86 during installation and removal, while also enabling maximized separation between the sleeve 70 and a sidewall of the vane 56.

Figure 13:
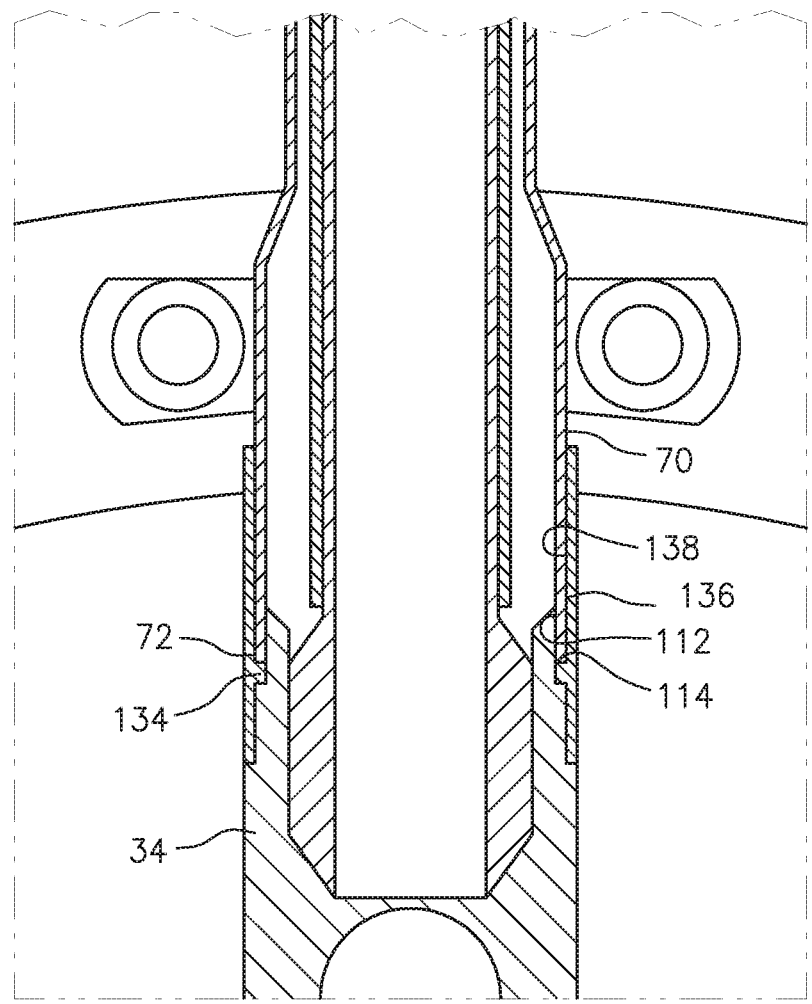
FIG. 13 is a sectional illustration of an assembly with an alternative slip joint interface between the shield and a port.

In some embodiments, referring to FIG. 13, the sleeve 70 may be received within (e.g., project into) an annular slot 134 forming in the port 34. In this manner, both an outer cylindrical surface 136 of the sleeve 70 and the inner cylindrical surface 112 of the sleeve 70 may contact and form seals with corresponding cylindrical surfaces 138 and 114 of the port 34.

Figure 14:
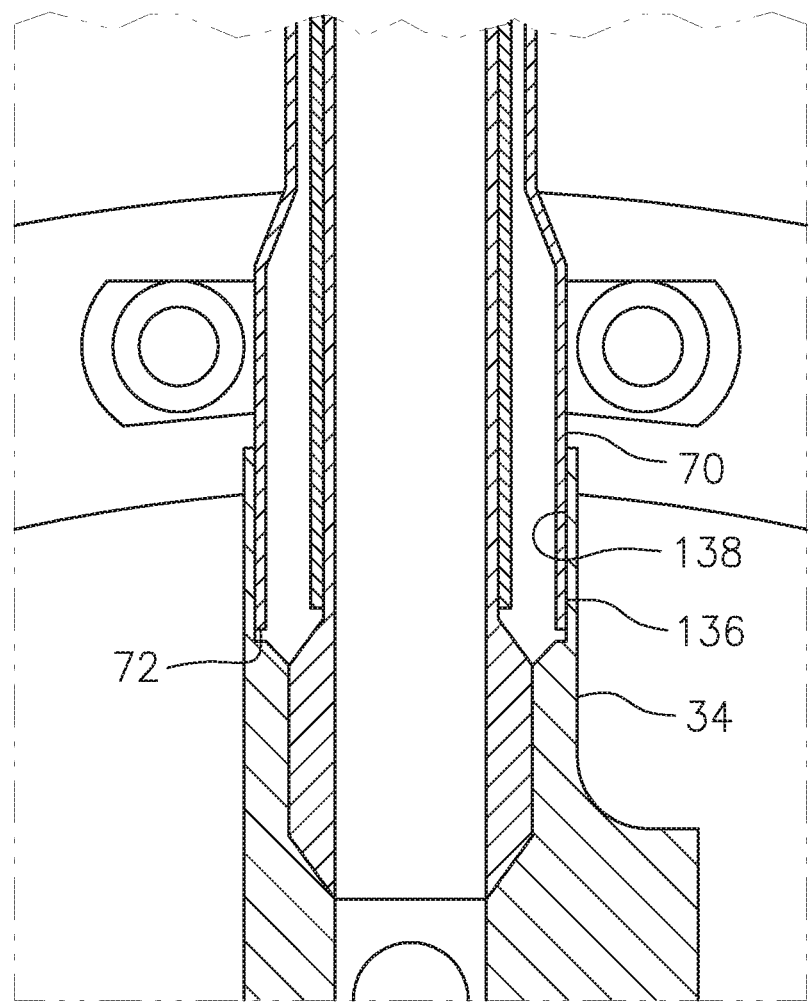
FIG. 14 is a sectional illustration of an assembly with another alternative slip joint interface between the shield and the port.

In some embodiments, referring to FIG. 14, the sleeve 70 may be received within (e.g., project into) the port 34 such that the port 34 circumscribes the sleeve 70 at the distal end 72 of the shield 62. In this manner, the outer cylindrical surface 136 of the sleeve 70 may contact and form a seal with the inner cylindrical surface 138 of the port 34.

In some embodiments, the fluid transfer tube 64 may be wrapped with insulation 139 as shown in FIG. 1.

In some embodiments, the fluid transfer assembly 26 may be configured without any additional seals (e.g., a conical seal and/or a ring seal) at the interface 116 between the surfaces 42 and 98 as shown in FIG. 4. However, in other embodiments, the fluid transfer assembly 26 may be further configured with an annular seal 139 (e.g., a ring seal or a conical seal) to bolster the cone seal interface 116 as shown, for example, in FIG. 15.

Figure 16:
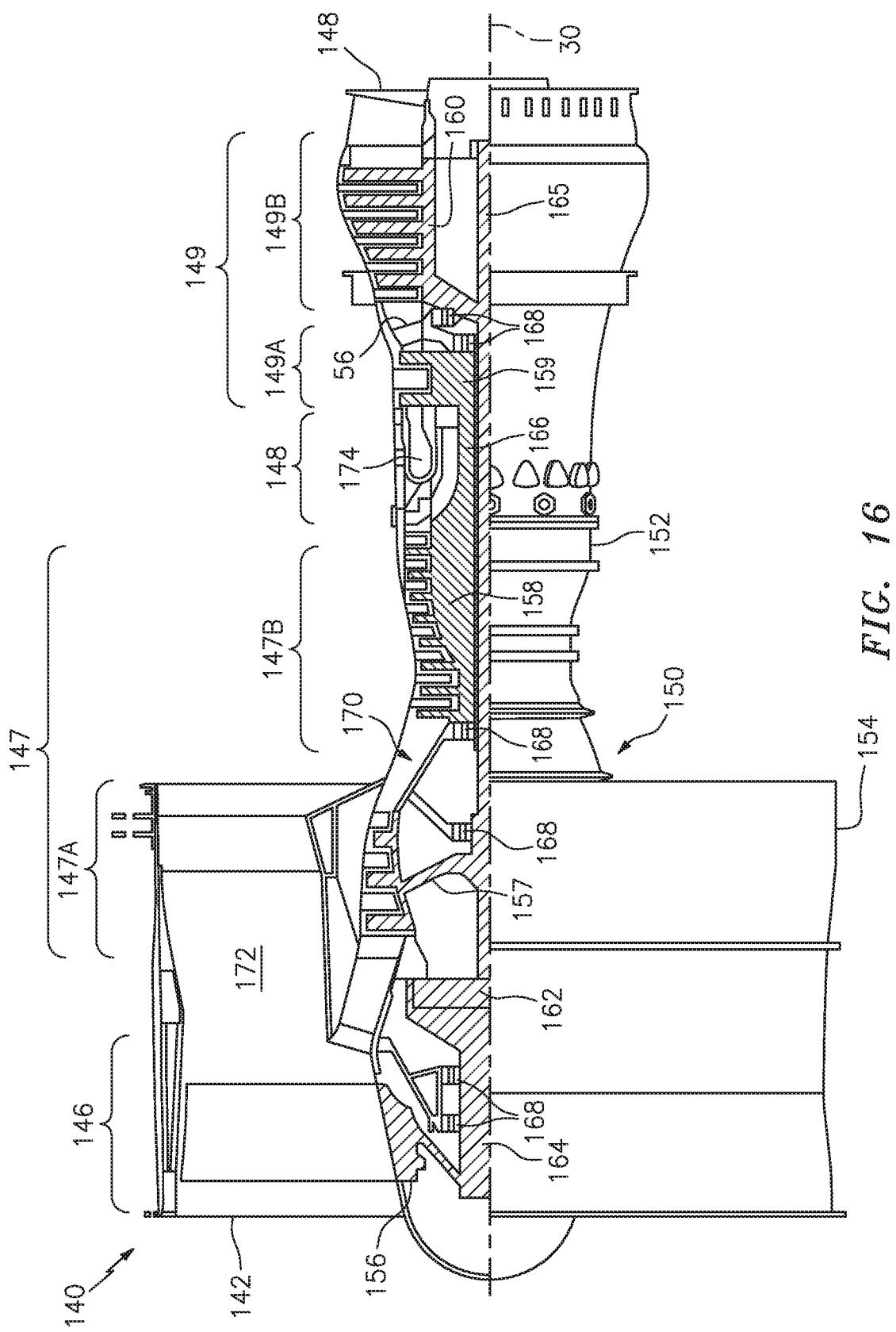
FIG. 16 is a side cutaway illustration of a geared gas turbine engine.

FIG. 16 is a side cutaway illustration of a geared gas turbine engine 140 with which the assembly 20 may be configured. This turbine engine 140 extends along the rotational axis 30 between an upstream airflow inlet 142 and a downstream airflow exhaust 144. The turbine engine 140 includes a fan section 146, a compressor section 147, a combustor section 148 and a turbine section 149. The compressor section 147 includes a low pressure compressor (LPC) section 147A and a high pressure compressor (HPC) section 147B. The turbine section 149 includes a high pressure turbine (HPT) section 149A and a low pressure turbine (LPT) section 149B.

The engine sections 146-149B are arranged sequentially along the axis 30 within an engine housing 150. This housing 150 includes an inner case 152 (e.g., a core case) and an outer case 154 (e.g., a fan case). The inner case 152 may house one or more of the engine sections 147A-149B (e.g., the engine core), and may include the outer structure 22 described above. The outer case 154 may house at least the fan section 146.

Each of the engine sections 146, 147A, 147B, 149A and 149B includes a respective rotor 156-160. Each of these rotors 156-160 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 156 is connected to a gear train 162, for example, through a fan shaft 164. The gear train 162 and the LPC rotor 157 are connected to and driven by the LPT rotor 160 through a low speed shaft 165. The HPC rotor 158 is connected to and driven by the HPT rotor 159 through a high speed shaft 166. The shafts 164-166 are rotatably supported by a plurality of bearings 168 (one of which may be the bearing 124 of FIG. 2); e.g., rolling element and/or thrust bearings. Each of these bearings 168 is connected to the engine housing 150 by at least one stationary structure such as, for example, an annular support strut. One example of such a stationary structure is the inner structure 24 described above.

During operation, air enters the turbine engine 140 through the airflow inlet 142. This air is directed through the fan section 146 and into a core gas path 170 and a bypass gas path 172. The core gas path 170 extends sequentially through the engine sections 147A-149B. The air within the core gas path 170 may be referred to as "core air". The bypass gas path 172 extends through a bypass duct, which bypasses the engine core. The air within the bypass gas path may be referred to as "bypass air".

The core air is compressed by the compressor rotors 157 and 158 and directed into a combustion chamber 174 of a combustor in the combustor section 148. Fuel is injected into the combustion chamber 174 and mixed with the compressed core air to provide a fuel-air mixture. This fuel-air mixture is ignited and combustion products thereof flow through and sequentially cause the turbine rotors 159 and 160 to rotate. The rotation of the turbine rotors 159 and 160 respectively drive rotation of the compressor rotors 158 and 157 and, thus, compression of the air received from a core airflow inlet. The rotation of the turbine rotor 160 also drives rotation of the fan rotor 156, which propels bypass air through and out of the bypass gas path 172. The propulsion of the bypass air may account for a majority of thrust generated by the turbine engine 140, e.g., more than seventy-five percent (75%) of engine thrust. The turbine engine 140 of the present disclosure, however, is not limited to the foregoing exemplary thrust ratio.

The assembly 20 and/or its fluid transfer assembly 26 may be included in various turbine engines other than the one described above as well as in other types of rotational equipment. The assembly 20 and/or its fluid transfer assembly 26, for example, may be included in a geared turbine engine where a gear train connects one or more shafts to one or more rotors in a fan section, a compressor section and/or any other engine section. Alternatively, the assembly 20 and/or its fluid transfer assembly 26 may be included in a turbine engine configured without a gear train. The assembly 20 and/or its fluid transfer assembly 26 may be included in a geared or non-geared turbine engine configured with a single spool, with two spools (e.g., see FIG. 16), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a piece of rotational equipment, comprising:
    an outer structure;
    an inner structure within the outer structure, the inner structure including a port;
    a shield including a shield mount and a sleeve, the shield mount attached to the outer structure, the sleeve extending from the shield mount through an aperture in the outer structure to a distal end of the shield, and the sleeve mated with the port at the distal end through a slip joint interface where a cylindrical sleeve surface of the sleeve contacts a cylindrical port surface of the port; and
    a fluid transfer tube including an inner tube end, an outer tube end, an inner coupling and an outer coupling, the fluid transfer tube extending from the inner tube end through a bore of the shield and at least into the port to the outer tube end, the inner coupling disposed at the inner tube end and mated with the inner structure through a cone seal interface, and the outer coupling disposed at the outer tube end and attached to the outer structure.

2. The assembly of claim 1, wherein the slip joint interface forms a complete seal between the sleeve and the port.

3. The assembly of claim 1, wherein the slip joint interface comprised an interference fit between the sleeve and the port.

4. The assembly of claim 1, wherein the sleeve circumscribes the port at the slip joint interface.

5. The assembly of claim 1, wherein
    the inner coupling has a maximum width; and
    the bore has a minimum diameter at the distal sleeve end that is greater than the maximum width.

6. The assembly of claim 5, wherein the bore is configured as a constant diameter bore.

7. The assembly of claim 1, wherein the inner coupling is attached to the inner structure by a threaded interface between the inner coupling and the inner structure.

8. The assembly of claim 1, wherein
    the inner coupling includes a frustoconical coupling surface; and
    the inner structure includes a frustoconical structure surface that contacts the frustoconical coupling surface at the cone seal interface.

9. The assembly of claim 1, further comprising an annular seal arranged at the cone seal interface.

10. The assembly of claim 1, further comprising a retainer rotatably fixing the outer coupling to the outer structure and attaching the shield mount to the outer structure.

11. The assembly of claim 10, wherein
    the retainer includes a fastener and a retainer plate;
    the retainer plate is rotatably fixed to the outer coupling through a second slip joint interface; and
    the fastener mounts the retainer plate and the shield mount to the outer structure.

12. The assembly of claim 1, wherein
    the outer structure comprises a casing;
    the inner structure comprises a bearing housing; and
    the fluid transfer tube is configured to deliver fluid to a passage in the bearing housing.

13. An assembly for a piece of rotational equipment, comprising:
    an outer structure;
    an inner structure within the outer structure, the inner structure including a port;
    a shield including a shield mount and a sleeve, the shield mount attached to the outer structure, the sleeve extending from the shield mount through an aperture in the outer structure to a distal sleeve end of the sleeve, and the sleeve mated with the port at the distal sleeve end through a slip joint interface which forms a complete seal between the sleeve and the port; and
    a fluid transfer tube including an inner tube end, an outer tube end, an inner coupling and an outer coupling, the fluid transfer tube extending from the inner tube end through a bore of the shield and at least into the port to the outer tube end, the inner coupling disposed at the inner tube end and mated with the inner structure through a cone seal interface, and the outer coupling disposed at the outer tube end and attached to the outer structure.

14. The assembly of claim 13, wherein a cylindrical sleeve surface of the sleeve contacts a cylindrical port surface of the port at the slip joint interface.

15. An assembly for a piece of rotational equipment, comprising:
    an outer structure;
    an inner structure within the outer structure, the inner structure including a port;
    a shield including a shield mount and a sleeve, the sleeve extending from the shield mount through an aperture in the outer structure to a distal sleeve end of the sleeve, and the sleeve mated with the port at the distal sleeve end through a slip joint interface;

a fluid transfer tube including an inner tube end, an outer tube end, an inner coupling and an outer coupling, the fluid transfer tube extending from the inner tube end through a bore of the shield and at least into the port to the outer tube end, the inner coupling disposed at the inner tube end and mated with the inner structure through a cone seal interface, and the outer coupling disposed at the outer tube end; and a retainer rotatably fixing the shield mount and the outer coupling to the outer structure.

16. The assembly of claim 15, wherein the retainer includes a fastener and a retainer plate;

the retainer plate is rotatably fixed to the outer coupling through a second slip joint interface; and the fastener mounts the retainer plate and the shield mount to the outer structure.

17. The assembly of claim 15, wherein the sleeve includes a cylindrical sleeve surface; and the port includes a cylindrical port surface that contacts the cylindrical sleeve surface at the slip joint interface.

* * * * *